UNITED STATES PATENT OFFICE.

JULIUS ABEL, OF MANNHEIM, AND FRITZ KALKOW, OF LUDWIGSHAFEN, GERMANY, ASSIGNORS TO BADISCHE ANILIN & SODA FABRIK, AT LUDWIGSHAFEN, GERMANY, A CORPORATION OF BADEN.

BLACK SULFUR DYE AND PROCESS OF MAKING SAME.

SPECIFICATION forming part of Letters Patent No. 692,174, dated January 28, 1902.

Application filed November 1, 1901. Serial No. 80,798. (No specimens.)

*To all whom it may concern:*

Be it known that we, JULIUS ABEL, doctor of philosophy and chemist, a citizen of the free Hansa town of Hamburg, residing at Mannheim, in the Grand Duchy of Baden, and FRITZ KALKOW, doctor of philosophy and chemist, a subject of the King of Prussia, German Emperor, residing at Ludwigshafen-on-the-Rhine, in the Kingdom of Bavaria, Germany, have invented new and useful Improvements in Black Coloring-Matter and Processes of Producing the Same, of which the following is a specification.

In the specification of Letters Patent No. 610,541 is described a blue-black dyestuff which is obtained by heating para-hydroxy-ortho-para-dinitro-diphenylamin with sulfur and alkaline sulfids. We have now discovered that an entirely-different coloring-matter is produced if the said hydroxy-dinitro-diphenylamin be melted with an alkaline sulfid and sulfur, or, what is equivalent for this invention, with caustic alkali and sulfur in the presence of copper (either in the form of its salts or in the finely-divided state) at a suitable temperature. A coloring-matter is thus obtained which dyes cotton direct deep black or greenish-black shades which are exceedingly fast to washing even without aftertreatment with bichromates and the like. If the dyeings obtained by means of the blue-black dyestuff produced according to the aforesaid specification, No. 610,441, be subsequently treated with copper salts on the fiber the resulting coloring-matter becomes essentially bluer, while our new product by this treatment becomes a less greenish black. Further, on treating the dyeings obtained by means of the new coloring-matter produced according to this invention with hydrogen peroxid they do not become blue, but dull blue-black. The dyestuff of the aforesaid specification, No. 610,541, dissolves in alcohol, the solution being green; but the dyestuff produced according to this invention is almost insoluble in alcohol.

The following examples will serve to further illustrate the nature of our invention and the manner in which the same may be carried into practical effect, but the invention is not confined to these examples. The parts are by weight.

Example 1: Into a solution of forty-six (46) parts of caustic soda and forty-two (42) parts of sulfur in forty-one (41) parts of water gradually introduce at a temperature of one hundred (100) to one hundred and ten (110) degrees centigrade thirty (30) parts of para-hydroxy-ortho-para-dinitro-diphenylamin simultaneously with a solution of eleven (11) parts of copper sulfate in seventy-two (72) parts of water. Heat and stir the mass until it becomes of a thick consistency, and then gradually raise the temperature to two hundred and twenty (220) degrees centigrade and continue heating until the mass is dry. When powdered, the melt can be directly employed for dyeing. It dissolves in water, the solution being deep blue. It dies cotton black.

Example 2: Gradually introduce into a solution of sixty (60) parts of sulfur in one hundred and fifty (150) parts of crystallized sodium sulfid at a temperature of about one hundred and ten (110) degrees centigrade thirty (30) parts of para-hydroxy-ortho-para-dinitro-diphenylamin and at the same time a solution of twelve (12) parts of copper sulfate in ninety (90) parts of water. Slowly heat to a temperature of about one hundred and forty (140) degrees centigrade until the mass becomes dry, and then raise the temperature to about two hundred (200) degrees centigrade and maintain this heat for about three (3) hours. The dyestuff produced can be directly employed for dyeing and is very similar to that of Example 1.

In the above example the twelve (12) parts of copper sulfate can be replaced by about three or four parts of finely-divided metallic copper.

Now what we claim is—

1. The manufacture of black coloring-matter by heating ortho-para-dinitro-para-hydroxy-diphenylamin with sulfur, an alkaline sulfid, and copper, substantially as described.

2. The new black coloring-matter containing sulfur such as can be obtained by melting ortho-para-dinitro-para-hydroxy-diphenylamin with sulfur, sodium sulfid and copper sulfate, which is almost insoluble in alcohol and dyes cotton, direct, deep black, to greenish-black, shades, which shades on treatment on the fiber with copper sulfate become but less greenish black, and on treatment with hydrogen peroxid do not become blue but dull blue-black, substantially as described.

In testimony whereof we have hereunto set our hands in the presence of two subscribing witnesses.

JULIUS ABEL.
FRITZ KALKOW.

Witnesses:
ERNEST F. EHRHARDT,
JACOB ADRIAN.